United States Patent [19]
Zurfluh et al.

[11] Patent Number: 5,122,214
[45] Date of Patent: Jun. 16, 1992

[54] METHOD OF MAKING A RUBBER LAMINATED GASKET

[75] Inventors: Thomas O. Zurfluh, Evanston; Donald J. McDowell, Riverside, both of Ill.

[73] Assignee: Fel-Pro Incorporated, Skokie, Ill.

[21] Appl. No.: 479,336

[22] Filed: Feb. 13, 1990

Related U.S. Application Data

[62] Division of Ser. No. 220,663, Jul. 18, 1988, abandoned.

[51] Int. Cl.⁵ .................. B32B 31/12; B32B 31/18; F16J 15/00
[52] U.S. Cl. .................. 156/220; 156/222; 156/278; 156/253; 156/307.3; 156/307.7; 277/228; 277/235 A; 277/235 B; 428/465; 428/466
[58] Field of Search .......... 156/220, 278, 307.7, 156/222, 307.1, 253, 307.3; 428/465, 466; 277/228, 233, 235 B, 235 A, 235 R

[56] References Cited

U.S. PATENT DOCUMENTS

| | | | |
|---|---|---|---|
| 1,766,471 | 6/1930 | Van Dusen | 428/465 X |
| 2,084,056 | 6/1937 | Balfe | 277/233 |
| 3,608,914 | 9/1971 | Harby | 277/235 B |
| 4,830,698 | 5/1989 | De Core et al. | 156/278 X |

*Primary Examiner*—Michael W. Ball
*Assistant Examiner*—Michele K. Yoder
*Attorney, Agent, or Firm*—Dressler, Goldsmith, Shore, Sutker & Milnamow, Ltd.

[57] ABSTRACT

A laminated gasket assembly and method of making same is disclosed. The laminated gasket assembly comprises first and second sheets, each having a thin metallic layer having a thin elastomeric coating on at least one major surface, and an elastomeric layer interposed between, and joining, the sheets, with first and second thin elastomeric coatings facing outwardly in opposite directions. The gasket assembly defines at least one elevated pressure service opening therethrough. The sheets and layers are laminated and define an embossment around a service opening, with the elastomeric layer being conformed to the embossment.

11 Claims, 2 Drawing Sheets

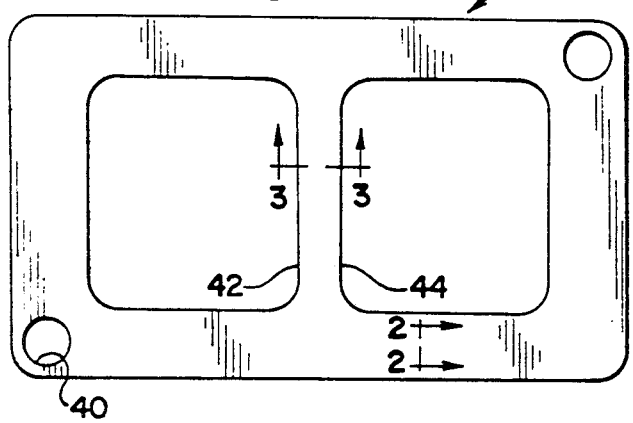
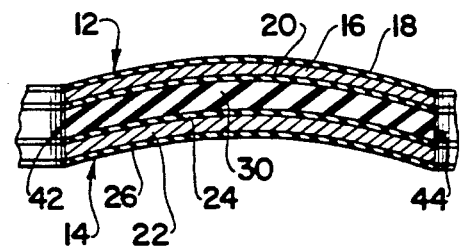
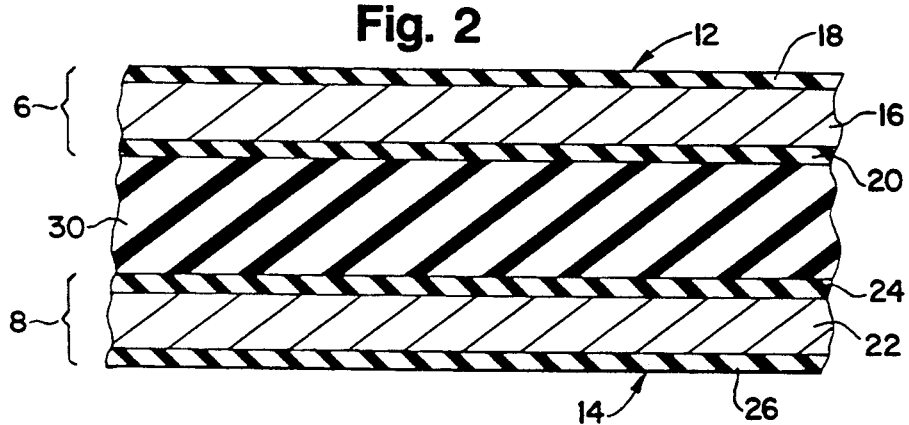
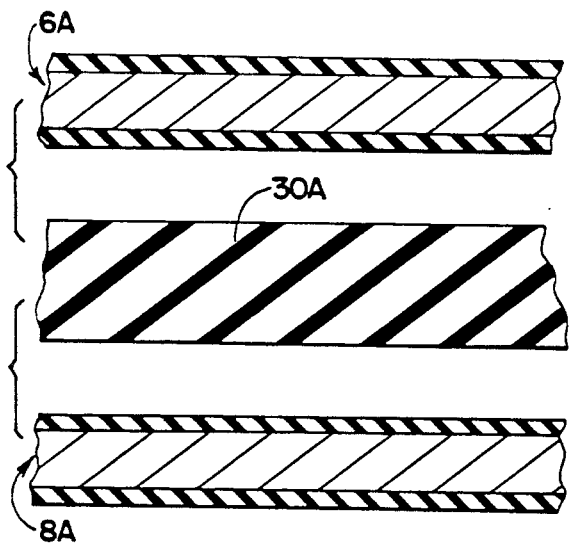
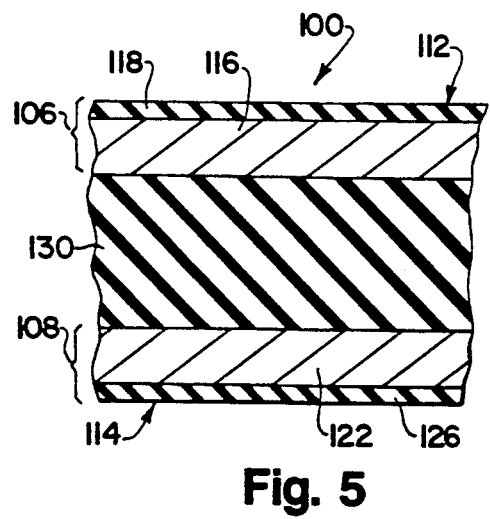

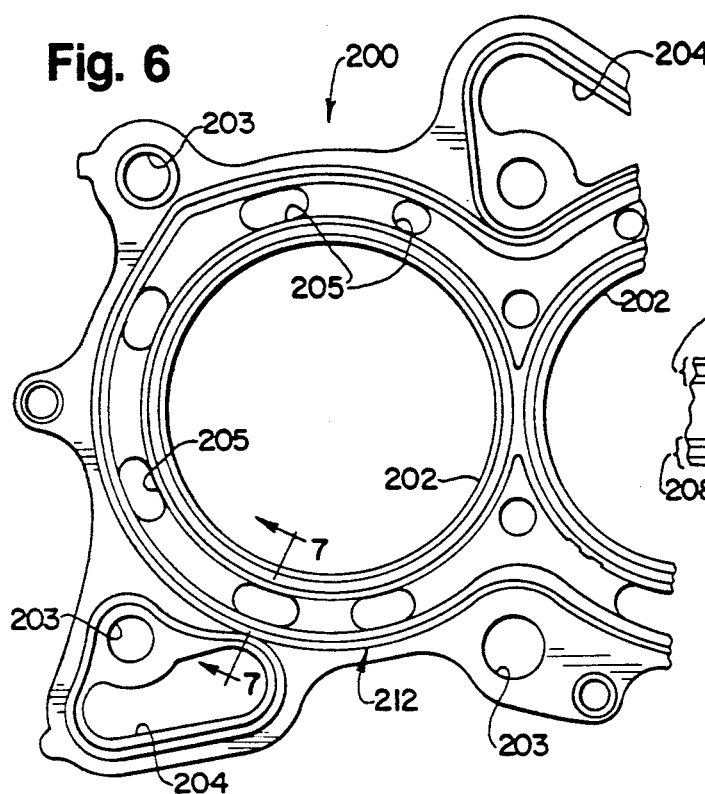
Fig. 6
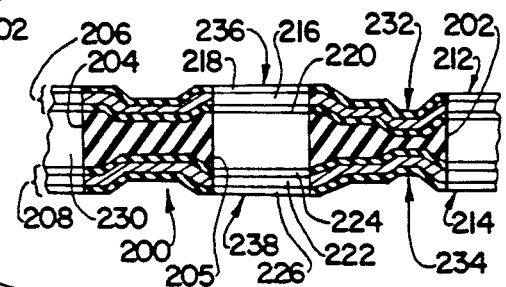
Fig. 7
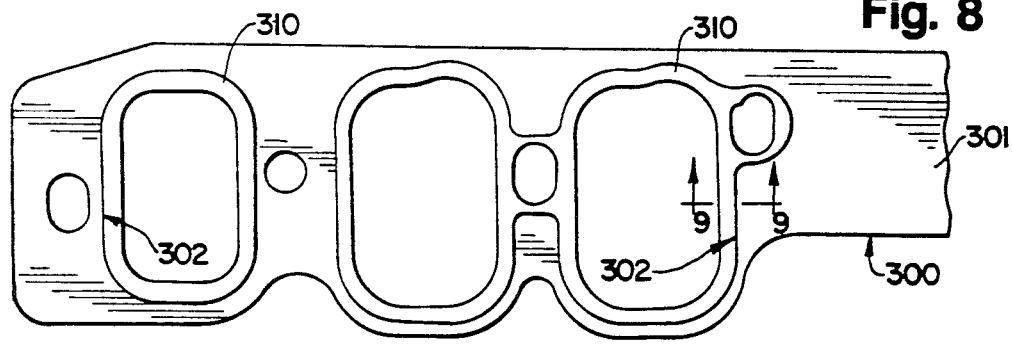
Fig. 8
Fig. 9
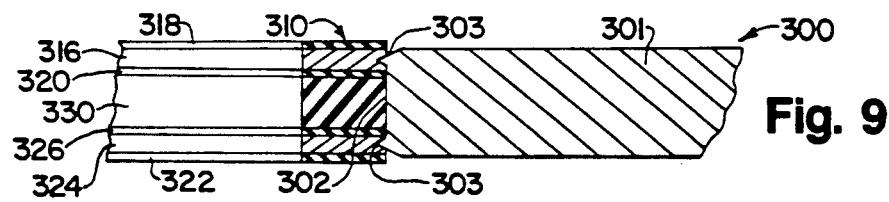
Fig. 10

METHOD OF MAKING A RUBBER LAMINATED GASKET

This is a division of application Ser. No. 07/220,663, filed Jul. 18, 1988, now abandoned.

BACKGROUND OF THE INVENTION

Currently gaskets used as automotive manifold gaskets, head gaskets, and the like are manufactured of multiple layers of metal, such as stainless steel, spring steel, carbon steel, and the like which are typically secured together, as by copper grommets and other mechanical means. One or more of the several layers are frequently coated with various materials for enhancing their microsealability, as with very thin coatings of high temperature resistant rubber, aluminum, and the like. Such gaskets frequently also employ embossments in one or more of the multiple layers, such as in the outermost of the layers, to enhance sealability around service openings, such as around the combustion openings and oil and water openings in head gaskets, etc.

Integrating multiple gasket pieces, and making certain they are integrated in correct fashion, requires careful assembly and is time consuming.

Improved multiple layer gaskets employing at least two metallic cores would be of advantage.

SUMMARY OF THE INVENTION

In accordance with the present invention, an improved multi-layer gasket assembly is provided. The laminated assembly comprises a first sheet of a first thickness including a first thin metallic layer having a first thin elastomeric coating on at least one major surface of the layer and a second sheet of a second thickness comprising a second thin metallic layer having a second thin elastomeric coating on at least one major surface of the layer.

An elastomeric layer, which is substantially thicker than the elastomeric coatings, is interposed between and joins the sheets, with the first and second thin elastomeric coatings facing outwardly in opposite directions.

The gasket assembly defines at least one service opening therethrough, at least one such opening being an elevated pressure opening. Preferably at least one of the sheets is corrugated, and defines an embossment around the service opening, the elastomeric layer being conformed to the embossment. In a preferred form each sheet is coated on each major surface of the metallic layer with an elastomeric coating.

Each sheet may be from about 0.007 to about 0.125 inch in thickness, and the elastomeric layer is from about 0.005 to about 0.110 inch in thickness, with the elastomeric coatings being from about 0.0005 to about 0.003 inch in thickness. Desirably the sheets are of a lesser thickness than the elastomeric layer.

The gasket assembly may be disposed and retained in an opening in a gasket body.

The invention also contemplates a method of making a laminated gasket, comprising providing first and second sheets as described, juxtaposing the sheets with an elastomeric layer between them, with a first and second coating facing outwardly, and laminating the juxtaposed coated layers and elastomeric layer to provide a unified laminate. The elastomeric layer may be a cured or uncured elastomeric layer which, if uncured, requires subsequent curing. The method may also comprise the further step of forming an embossment in at least one of said first and second sheets, and preferably to surround a service opening.

The embossment may be formed by cutting through one of the metallic layers of the laminate to deform the laminate to provide a projecting embossment.

Further objects, features, and advantages of the present invention will become apparent from the following description and drawings.

BRIEF DESCRIPTION OF THE DRAWINGS

FIG. 1 is a plan view of a gasket formed in accordance with the present invention;

FIG. 2 is a greatly enlarged cross-sectional view taken substantially along line 2—2 of FIG. 1;

FIG. 3 is an enlarged cross-sectional view taken substantially along line 3—3 of FIG. 1;

FIG. 4 is an exploded schematic view of the gasket of FIG. 1 prior to lamination;

FIG. 5 is a greatly enlarged cross-sectional veiw like that of FIG. 2, but of a further embodiment of this invention;

FIG. 6 is a plan view of another gasket of the present invention;

FIG. 7 is a cross-sectional view taken substantially along line 7—7 of FIG. 6;

FIG. 8 is a plan view of a section of a further gasket formed in accordance with the present invention;

FIG. 9 is a cross-sectional view taken substantially along line 9—9 of FIG. 8; and FIG. 10 is a schematic view of a method of forming an embossment in a gasket like the gasket of FIG. 1, but showing certain aspects of the gasket in exaggerated form for illustrative purposes.

DESCRIPTION OF THE PRESENTLY PREFERRED EMBODIMENTS

Referring first to FIGS. 1-4, inclusive, a gasket 1 in accordance with this invention comprises a first outer surface 12 and a second outer surface 14 (see FIG. 2). The gasket 1 further comprises a first sheet 6 comprising a first metallic layer 16 with very thin coatings 18 and 20, as of rubber, on each of its major surfaces, and a second sheet 8 comprising a first metallic layer 22, with very thin coatings 24, 26, as of rubber, on each of its major surfaces. Gasket 1 further comprises an intermediate integrating rubber layer 30 which is laminated with sheets 6 and 8 to form a unitary gasket body. As shown by the drawings, the metallic sheets are imperforate.

As best seen in FIG. 1, gasket 1 defines a plurality of openings, such as a pair of bolt holes 40, and a pair of service openings, such as an elevated or high pressure service opening 42, and a low pressure service opening 44. The gasket 1, when clamped between mating surfaces (not shown) to be sealed is intended to seal around and between the service openings 42, 44.

As seen in FIG. 4, the gasket 1 is formed from a juxtaposed plurality of sheets, such as a first sheet 6A, a second sheet 8A and an elastomeric or rubber sheet 30A which may be uncured prior to lamination. Following assembly and lamination of sheets 6A, 8A and 30A under heat and pressure to cure sheet 30A, a basic unified laminate or gasket body 1 is ready for severance from the sheet, and for the provision of the various openings.

In the embodiment illustrated, the overall gasket 1 is relatively thin, and the individual sheets 6A, 8A and 30A are thin, sheets 6A and 8A being of a lesser thickness than layer 30A. Thus, typically, sheets 6A and 8A which may, if desired, be of the same stock, may have metal layers 16 and 22 of a thickness of about 0.01 inch and coatings 18, 20, 24 and 26 of a thickness of about 0.0025 inch. The rubber layer 30 may be about 0.02 inch, thereby producing a gasket of a total thickness of about 0.05 inch, i.e., of less than about 1/16 inch in total thickness.

As such, when the gasket is cut or punched to provide the openings 42, 44, especially if a rule die type of cutting procedure is implemented for forming the openings, the metal layers will tend to be deformed to produce a gentle embossed configuration between the openings. That configuration is illustrated by FIG. 3 which shows a slight bending in the zone between the openings 42, 44, thereby producing both a high point at one surface, such as surface 12, and a pair of depressions at the other surface, such as surface 14. Under appropriate circumstances that produces an enhanced seal at a point at which it will be most needed, i.e., at the zone between the high and low pressure service openings 42, 44.

Of course, whether or not an embossment-like configuration is produced, the integrated laminated gasket 1, of the first embodiment provides an effective seal under relative high pressure, and, when high temperature rubber is used, may be effectively used as a substitute for multi-piece, mechanically assembled head gaskets and other high temperature gaskets. Furthermore, laminated gaskets of the present invention require no integrating spot welds, grommets or other mechanical fastening means, which would, inter alia, take up sealing stresses. As such all of the sealing stresses may go towards effective sealing. Neither is there resistance to relative lateral thermal motion of the opposed surfaces to be sealed by gasket 1, because the rubber will permit and accommodate to lateral movement without requiring sliding movement of the flange surfaces relative to the gasket. In other words, the present gasket accommodates to some movement in shear between the mating surfaces to be sealed.

The gasket of FIG. 1 may employ elastomeric rubber coatings 18, 20, 24, and 26 of Viton, a fluoroelastomer rubber available from E.I. DuPont. Similar materials are available from 3M and others. This is not to the exclusion of other elastomers. The integrating elastomeric layer 30 may be any suitable elastomer, but is usually the same as the coatings 18, 20, 24, 26. Although the elastomeric materials may be conventional rubber-like materials such as nitrile rubber and neoprene and the like, thermoplastic materials which have the characteristics of elastomers may be considered as elastomeric. Typical suitable thermoplastic elastomers are polyolefin based thermoplastics, polyurethane thermoplastics, and Kraton, D and G grades, a styrene based thermoplastic elastomer available from Shell Oil.

The metallic layers 16 and 22, which may preferably be of stainless steel, spring steel or carbon steel, may range in thickness from about 0.006 to about 0.060 inch, the rubber layer 30 may range in thickness from about 0.005 to about 0.110 inch, and the rubber coatings may range in thickness from about 0.0005 to about 0.0030.

Unlike mechanically secured, multi-piece gaskets, gaskets of the present invention are effective to seal hydraulic motors where high alternating pressures of up to as much as 600 psi are encountered and where high vibration is encountered. The gasket resists erosion due to impingement of hydraulic oils in motor control valve gaskets. And, as the flanges to be sealed move laterally relative to each other, the dual metallic cores allow the microsealing capacity of the gasket coatings 18 and 26 to be maintained. Of course different coatings or rubber materials can be used to accommodate to special sealing needs at the opposed flange surfaces to be sealed.

As pointed out, when a rule die cutting procedure (or other equivalent substitute) is used, a natural embossing occurs, providing for sealing stress to be more concentrated, hence to be somewhat more effective in selected zones, and without the need for adjuncts or special secondary processing steps or techniques to be used to enhance the sealing characteristics in such zones. Further, the concentration of sealing stresses in desired locations can be adjusted for available load by selectively changing the outline of the gasket or by adding holes or slots.

It is clear that the thin multi-layered, laminated construction of the present invention is considerably improved over gaskets formed solely from rubber. Thus the opposed flange surfaces to be sealed are more effectively sealed because the metallic cores control friction at those surfaces. The gaskets have good recovery and higher stress retention than solid rubber gaskets. Furthermore, unlike solid rubber gaskets, gaskets of the present invention permit the use of different rubbers where different qualities and properties are desired, and where those qualities and properties are not available in a single material. Thus, effective surface sealing and high temperature characteristics, where needed, can be obtained, while desirable rubber characteristics between the sheets may be obtained with a different rubber composition.

Referring now to FIG. 5, a further embodiment of the present invention, which may be generally like that of the embodiment of FIGS. 1-4, comprises a gasket 100, having a first sheet 106 and a second sheet 108. First sheet 106 comprises a first metallic core or layer 116 and an outer rubber coating 118 defining a first outer surface 112. Second sheet 108 comprises a second metallic core or layer 122 and an outer rubber coating 126 defining a second outer surface 114. Sheets 106 and 108 are laminated with and formed with an intermediate rubber layer 130 in much the same manner as the embodiment of FIG. 1. The embodiment of FIG. 5 may be used and will function in a manner similar to that of the embodiment of FIGS. 1-4.

Referring now to FIGS. 6 and 7, a portion of a further gasket 200 is there shown. Gasket 200 may be a head gasket defining a plurality of high pressure combustion openings 202, bolt holes 203, lower pressure oil ports 204, and lower pressure coolant openings 205. An upper outer sealing surface 212 and a lower outer sealing surface 214 comprise the upper and lower surfaces of gasket 200.

Gasket 202 comprises a laminated assembly including a first sheet 206, a second sheet 208 and an intermediate integrating rubber layer 230. Sheet 206 comprises a metallic core 216 with thin rubber coatings 218 and 220. Sheet 208 comprises a metallic core 222 with thin rubber coatings 224 and 226. As may be appreciated, each of the sheets 206 and 208 are corrugated as by being embossed prior to lamination and have inwardly extending embossments 232, 234 around the combustion openings 202, as well as outwardly extending embossments 236, 238, as in the zone of the coolant openings 205. Other suitable embossments may be formed as well to concentrate sealing stresses, but without necessarily requiring surface adjuncts such as printed elastomeric beads and the like.

When the sheets 206 and 208 are laminated with the rubber layer 230 to form the integrated gasket 200, the space between the sheets may be entirely filled, thereby to conform the elastomeric layer 230 to the embossments, and to provide an appropriately configured, highly effective head gasket 200. As may be appreciated embossments for a variety of purposes may be provided to surround openings, as illustrated in FIGS. 6 and 7, or may be otherwise used to replace other adjuncts as desired. Typically, however the gasket sections 206, 208 may be embossed prior to lamination, although where the embossments are nesting, rather than opposed, as the embossments in FIG. 7 are illustrated as being, embossments may be formed after the gasket body is laminated. Of course, one of the gasket sections 206, 208 may be embossed in a given location without the vertically aligned portion of the other gasket section having an opposed or nesting embossment in the other gasket section. In all cases, however, the rubber intermediate layer fills the space between the coated cores and, where the embossment projects outwardly, fills the space inside the embossment as well. As such, the rubber or elastomeric intermediate layer is protected, and will not extrude as it might under high sealing stresses when it is surface deposited, as a sealing bead adjunct might.

Also, as was the case with the preceding embodiments, the coatings on the outsides and insides of the cores may be different, or may be omitted from one of the sides of the cores, as illustrated in connection with FIG. 5. Thus, as previously mentioned, the microsealing capacity may be adjusted on the outside, and the rubber used on the inside may be varied according to the properties desired.

Referring now to FIGS. 8 and 9, a manifold intake gasket 300 is there illustrated. Gasket 300 defines a plurality of openings 302 requiring sealing. Grommets 310 may be inserted in the openings 302. Openings 302 may be formed, as by die-cutting, from a sheet of material, such as that illustrated in FIG. 2. The grommets 310 may be press-fit or frictionally retained in the openings, or they may be retained as by staking into place in the openings, as illustrated best in FIG. 9.

As seen in FIG. 9, a grommet 310 is secured with the gasket body 301 in the opening 302. Grommet 310 comprises a pair of sheets having metallic layers 316 and 322, each suitably coated with rubber coatings 318, 320, 324 and 326. The sheets are integrated with a rubber layer 330 laminated therebetween. The grommet may be cut-out, as by die-cutting, from a sheet of stock material.

The grommets 310 are proportioned to closely fit within the openings 302. Where desired, to maintain the connection between grommets 310 and the gasket body 301, the metal may be swaged at several spaced peripheral locations 303 to stake the grommets in place.

FIG. 10 schematically illustrates a method of forming an embossment in a sheet of gasket material, such as that of FIG. 5. As shown in FIG. 10, a sheet S of the structure of FIG. 5 has been provided with an opening H about which an embossment E is desired. To that end an embossment is provided after the sheet S has been formed and integrated by cutting into a first side F along L about the opening H and through one of the cores C. The cutting deforms the cut core C to provide a slight rise, namely the projecting embossment E. On the other side G, the uncut core D is slightly deformed to provide small projecting feet L which also enhance the sealing effect at surface G. Thus, the cutting process itself provides zones of increased sealing stress, but without the need for an adjunct, such as unprotected surface deposited elastomeric sealing beads.

It will be apparent to those skilled in the art that other and further embodiments and changes may be made in accordance with the present invention. Accordingly, the invention is not to be considered as being limited, except as may be necessitated in accordance with the claims.

What is claimed is:

1. A method of making a thin laminated gasket having a microsealing capacity at its outwardly facing sealing surfaces comprising providing a first imperforate metallic core with a first thin elastomeric surface coating on at least one major surface thereof, providing a second imperforate metallic core with a second thin elastomeric surface coating on at least one major surface thereof, said surface coatings on said first and second imperforate metallic cores being from about 0.0005 to about 0.003 inch in thickness, juxtaposing said coated cores and providing an elastomeric layer between them with said first and second surface coatings facing outwardly, said elastomeric layer being substantially thicker than said surface coatings, laminating said juxtaposed surface coated cores and layer to provide a unified laminate, and providing a plurality of openings through said laminate, said openings including at least one service opening.

2. A method of making a laminated gasket in accordance with claim 1, and wherein said elastomeric layer is an uncured elastomeric layer, and said laminating step occurs under pressure during which said uncured elastomeric layer is cured.

3. A method of making a laminated gasket in accordance with claim 1, and comprising the further step of forming an embossment in at least one of said first and second cores around said service opening.

4. A method of making a laminated gasket in accordance with claim 1, and comprising the step of providing a thin elastomeric coating on each of the major surfaces of each of said first and second cores and thereafter juxtaposing said coated cores and providing said elastomeric layer between them.

5. A method of making a laminated gasket in accordance with claim 1, and wherein the first and second outwardly facing coatings are of different elastomers.

6. A method of making a laminated gasket in accordance with claim 1, and comprising the further step of forming an embossment to surround said service opening.

7. A method of making a laminated gasket in accordance with claim 3, and wherein said embossment is formed by cutting through one of the cores of said laminate to deform said laminate to provide a projecting embossment.

8. A method of making a laminated gasket in accordance with claim 1, and comprising the further step of embossing at least one of said cores prior to laminating.

9. A method of making a laminated gasket in accordance with claim 1, and wherein the metallic cores are each about 0.01 inch in thickness and the laminated gasket is about 0.05 inch in total thickness.

10. A method in accordance with claim 6, and wherein said embossment is formed by cutting through said laminate to form said embossment.

11. A method in accordance with claim 10, and wherein said cutting is by a rule die cutting process.

* * * * *